United States Patent
Markey et al.

(10) Patent No.: US 11,216,562 B2
(45) Date of Patent: Jan. 4, 2022

(54) DOUBLE WRAPPING FOR VERIFICATION

(71) Applicant: Micron Technology, Inc., Boise, ID (US)

(72) Inventors: Tim Markey, Boise, ID (US); James Ruane, Boise, ID (US); Robert W. Strong, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 192 days.

(21) Appl. No.: 16/731,918

(22) Filed: Dec. 31, 2019

(65) Prior Publication Data

US 2021/0200874 A1    Jul. 1, 2021

(51) Int. Cl.
| | |
|---|---|
| *G06F 21/57* | (2013.01) |
| *H04L 9/06* | (2006.01) |
| *G06F 21/64* | (2013.01) |
| *H04L 9/32* | (2006.01) |
| *G06F 21/60* | (2013.01) |

(52) U.S. Cl.
CPC .......... *G06F 21/572* (2013.01); *G06F 21/575* (2013.01); *G06F 21/602* (2013.01); *G06F 21/64* (2013.01); *H04L 9/0643* (2013.01); *H04L 9/3249* (2013.01)

(58) Field of Classification Search
CPC .... G06F 21/572; G06F 21/575; G06F 21/602; G06F 21/64; H04L 9/0643; H04L 9/3249
See application file for complete search history.

(56) References Cited

U.S. PATENT DOCUMENTS

| | | | | |
|---|---|---|---|---|
| 2004/0019796 A1* | 1/2004 | Wang | ............. | G06F 21/572 |
| | | | | 713/189 |
| 2009/0257595 A1* | 10/2009 | de Cesare | ............. | G06F 21/575 |
| | | | | 380/277 |
| 2012/0079287 A1* | 3/2012 | Leclercq | ............. | G06F 21/575 |
| | | | | 713/192 |
| 2015/0261521 A1* | 9/2015 | Choi | ............. | H04L 63/12 |
| | | | | 713/176 |
| 2017/0293484 A1* | 10/2017 | Haase | ............. | H04L 9/14 |

* cited by examiner

*Primary Examiner* — Ayoub Alata
(74) *Attorney, Agent, or Firm* — Holland & Hart LLP

(57) ABSTRACT

Methods, systems, and devices for double wrapping for verification are described. In some cases, a memory subsystem can receive a firmware image for the memory subsystem where the firmware image is signed with a first signature according to a first signing procedure. The memory subsystem can then verify an integrity of the firmware image based on the first signing procedure. After verifying the integrity of the firmware image, the memory subsystem can then generate a second signature for the firmware image based on a second signing procedure different from the first signing procedure. The memory subsystem can then write the second signature to the firmware image. The memory subsystem can then perform a verification process to verify the integrity of the firmware image based on one or both of the first signing procedure or the second signing procedure. In this case, a first verification time is associated with the first signing procedure and is greater than a second verification time associated with the second signing procedure.

18 Claims, 4 Drawing Sheets

DOUBLE WRAPPING FOR VERIFICATION

TECHNICAL FIELD

The following relates generally to a memory sub-system and more specifically to double wrapping for verification of a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

DETAILED DESCRIPTION

Figure 1:
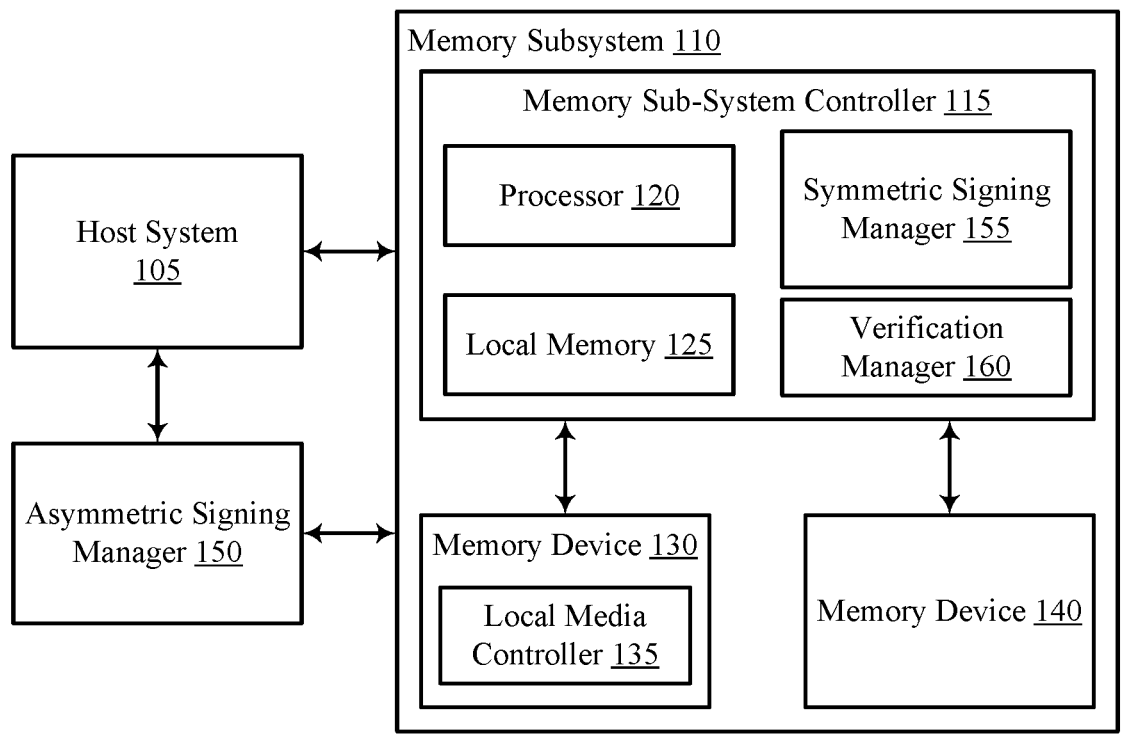
FIG. 1 is an example of a computing system in accordance with examples as disclosed herein.

Aspects of the present disclosure are directed to double wrapping for verification. A memory sub-system can be a storage device, a memory module, or a hybrid of a storage device and memory module. Examples of storage devices and memory modules are described with reference to FIG. 1. In general, a host system can utilize a memory sub-system that includes one or more components, such as memory devices that store data. The host system can provide data to be stored at the memory sub-system and can request data to be retrieved from the memory sub-system.

A memory sub-system can receive a firmware image (e.g., for updating the firmware of the memory sub-system). The firmware image can be downloaded (e.g., from a server), or sent to the memory sub-system from another source such as the manufacturer of the memory sub-system or the firmware manufacturer. If, however, the firmware image is corrupt (e.g., data of the firmware is unreadable or invalid) or hacked by an attacker such that the firmware image contains code different from its source code, the memory sub-system that loads the corrupt or hacked firmware can be subject to inoperability, data loss, or other malicious attacks. In some examples, the firmware image can become corrupt after the firmware image is received and loaded (e.g., stored) at the memory sub-system. To address corruption or other firmware issues, the memory sub-system can be configured to verify the integrity of the firmware image to ensure that the firmware image is not corrupt or has not been hacked. The verification can be performed when the memory sub-system receives the firmware image and/or when the memory sub-system powers on (e.g., boots up) and runs the firmware. Depending on the verification technique used by the memory sub-system, latency of the memory sub-system's operation or boot-up procedure can be introduced due to the time that it takes for the verification technique to verify the integrity of the firmware image.

Aspects of the present disclosure address the above and other deficiencies by having a memory sub-system that includes a verification manager, which can verify the integrity of a firmware image using multiple types of cryptographic procedures and/or redundant cryptographic procedures. For example, the verification manager can verify the firmware image based on a symmetric cryptographic procedure, an asymmetric cryptographic procedure, or both. The ability to verify the firmware image via different cryptographic procedures enables the memory sub-system to maintain security of the memory sub-system while lowering the impact of the firmware verification on the latency of the memory sub-system.

Features of the disclosure are initially described in the context of a computing environment as described with reference to FIG. 1. Features of the disclosure are described in the context of a flow and system diagram as described with reference to FIGS. 2 and 3. These and other features of the disclosure are further illustrated by and described with reference to a computer system that relates to double wrapping for verification as described with reference to FIG. 4.

FIG. 1 is an example of a computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled to one or more memory sub-systems 110 and/or an asymmetric signing manager 150. In some embodiments, the host system 105 is coupled to different types of memory sub-system 110. FIG. 1 illustrates one example of a host system 105 coupled to one memory sub-system 110 and/or an asymmetric signing manager 150. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, etc.

The computing system 100 can include an asymmetric signing manager 150. In some examples, asymmetric signing manager 150 can receive a firmware image from a source, such as host device 105. The firmware image can be a new firmware image, or an updated firmware image that is communicated to memory sub-system 110 to update the firmware of memory sub-system 110. The firmware image can be received by asymmetric signing manager 150, and asymmetric signing manager 150 can sign (e.g., write) a cryptographic signature, such as an asymmetric cryptographic signature to the firmware image. The signing of the firmware image with the cryptographic signature can occur in a secure environment. The asymmetric cryptographic signature can be based upon a cryptographic algorithm, such as a Rivest Shamir Adleman (RSA) algorithm. The cryptographic signature can be associated with a public key that can be shared with one or more devices, and a private key that can be shared with a limited number of devices. The public key and private key can be associated with the cryptographic algorithm. The combination of the public and private keys can be used to verify the firmware images integrity based upon one or more cryptographic procedures. For example, the asymmetric cryptographic signature can be verified based upon an asymmetric cryptographic procedure which can use the asymmetric cryptographic algorithm. Asymmetric signing manager 150 can communicate the signed firmware image to the memory sub-system 110, where verification of the firmware image can occur.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 105 uses the memory sub-system 110, for example, to write data to the memory sub-system 110 and read data from the memory sub-system 110.

The host system 105 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 105 and the memory sub-system 110. The host system 105 can further utilize an NVM Express (NVMe) interface to access components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include read-only memory (ROM) for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 as well as convert responses associated with the memory devices 130 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the media device 130 (e.g., perform media management operations on the media device 130). In some embodiments, the memory devices 130 can be locally managed memory devices, which is a raw memory device combined with a local media controller 135 that performs memory management operations on the memory device 130 within the same memory device package.

The memory sub-system 110 includes a symmetric signing manager 155 which can sign the firmware image with a cryptographic signature. A firmware image can be received by memory device 110, which can include a first cryptographic signature that asymmetric signing manager 150 signed to the firmware image. Symmetric signing manager 155 can then sign (e.g., write) a second cryptographic signature, such as a symmetric cryptographic signature, to the firmware image. The symmetric cryptographic signature can be based upon a second cryptographic algorithm, such as a hash-based message authentication code (HMAC) algorithm. The cryptographic signature can be generated using a secret key that is not shared with any devices outside of memory sub-system 110. The secret key can be associated with the symmetric cryptographic algorithm. The secret key can be used to verify the firmware images integrity based upon one or more cryptographic procedures. For example, the symmetric cryptographic signature can be verified based upon a symmetric cryptographic procedure which can use the symmetric cryptographic algorithm.

In some examples, the memory sub-system controller 115 includes at least a portion of the symmetric signing manager 155. For example, the memory sub-system controller 115 can include a processor 120 (e.g., a processing device) configured to execute instructions stored in local memory 125 for performing the operations described herein. In some examples, the symmetric signing manager 155 is part of the host system 105, an application, or an operating system. Further details with regards to the operations of the symmetric signing manager 155 are described herein.

The memory sub-system 110 includes a verification manager 160 that can verify the integrity of the received firmware image through a verification process. Verification manager 160 can receive the signed firmware image from asymmetric signing manager 150, which has been signed with the first (e.g., asymmetric) cryptographic signature. The asymmetric cryptographic signature can be generated using the private key associated with the asymmetric cryptographic algorithm. In some cases, the signed firmware image can also include a symmetric cryptographic signature signed by symmetric signing manager 155. The symmetric cryptographic signature can be generated using the secret key associated with the symmetric cryptographic algorithm. Verification manager 160 can initially verify the firmware image based upon a public key associated with the secret key used to sign the firmware image by asymmetric signing manager 150. This can occur before symmetric signing manager 155 signs the firmware image with the symmetric cryptographic signature.

Upon boot-up of memory sub-system 110, verification manager 160 can again verify the firmware image. However, rather than verifying the firmware image based upon the asymmetric cryptographic signature upon boot-up, verification manager 160 can use a verification procedure involving the second (e.g., symmetric) cryptographic signature and/or the asymmetric cryptographic signature. For example, the verification procedure can include attempting to verify the symmetric cryptographic signature. If verification manager 160 verifies the firmware image based upon the symmetric cryptographic signature, then memory sub-system 110 can be allowed to boot-up using the firmware image. If verification manager 160 fails to verify the firmware image based upon the symmetric cryptographic signature, then the verification manager can attempt to verify the firmware image based upon the asymmetric cryptographic signature. If verification manager 160 verifies the asymmetric cryptographic signature, then memory sub-system 110 can be allowed to boot-up using the firmware image. However, if verification manager 160 fails to verify the firmware image based upon the asymmetric cryptographic signature, in addition to the symmetric cryptographic signature, then the memory sub-system can indicate a failure to verify the firmware image and prevent boot-up of memory sub-system 110 using the firmware image. In some cases, the verification of the symmetric cryptographic signature can take less time than the verification of the asymmetric cryptographic signature. This can be due to the cryptographic algorithms used in the generation and verification of the cryptographic signatures. For example, the symmetric cryptographic signature may be generated and verified based on a symmetric cryptographic algorithm (e.g., an HMAC algorithm). In some cases, the verification of the symmetric cryptographic signature may be faster than verification of a asymmetric signature because the asymmetric signature was generated and verified based upon an asymmetric cryptographic algorithm (e.g., an RSA algorithm). In this case the verification of the symmetric cryptographic signature may take less time than the verification of the asymmetric cryptographic signature due to the difference in the cryptographic algorithms used to generate and validate the signatures. Therefore, in the case where the firmware image's integrity is verified by the symmetric cryptographic signature, latency in the boot-up operation can be reduced. However, a fallback verification of the asymmetric cryptographic signature can still allow for the device to boot-up, even if the symmetric cryptographic signature's verification fails.

Figure 2:
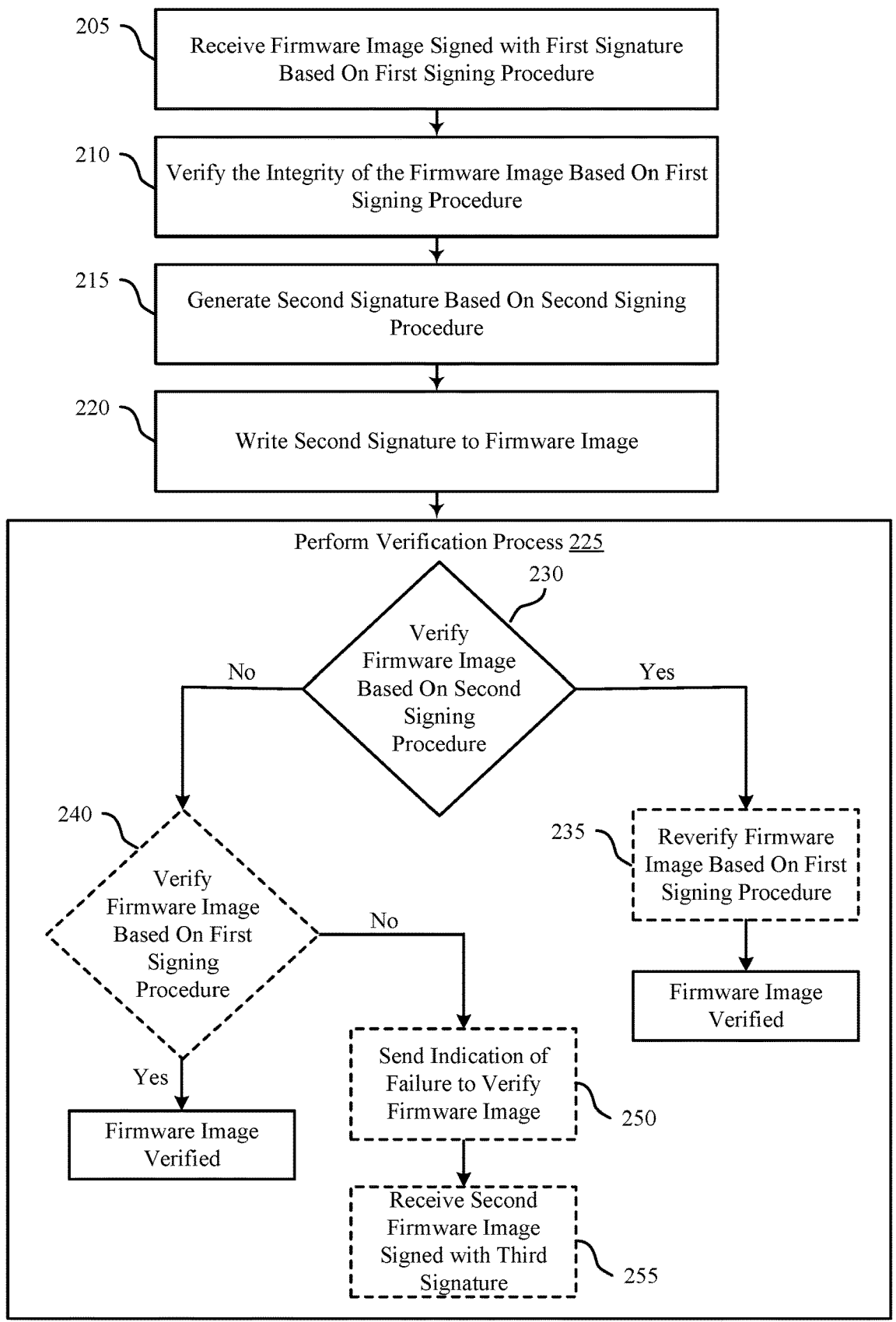
FIG. 2 is a flow diagram of an example method to verify the integrity of a firmware image of a memory sub-system in accordance with some embodiments of the present disclosure.

FIG. 2 is a flow diagram of an example method 200 to verify a new firmware image received by a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by one or more of the asymmetric signing manager 150, the symmetric signing manager 155, and/or the verification manager 160 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the memory sub-system can receive a new firmware image for the memory sub-system. The new firmware image can be received from a variety of sources, including a host system, a cloud service, over the internet, and/or a server (e.g., a server hosting the firmware image such as a server associated with a manufacturer of the firmware image). The new firmware image can include a first cryptographic signature written to the firmware image by a first signing procedure. This cryptographic signature can be used to verify the integrity of the firmware image based upon a first signing procedure. For example, the new firmware image can be received by the memory sub-system containing an asymmetric cryptographic signature based upon an asymmetric signing procedure. The asymmetric cryptographic signature can be a signature written to a portion of the firmware image and used to verify the firmware image based upon the associated cryptographic algorithm. For example, an asymmetric cryptographic algorithm, such as a Rivest Shamir Adleman (RSA) algorithm, can be used in the generation of the symmetric cryptographic signature. Signing of the asymmetric cryptographic signature can be performed by a signing manager, such as asymmetric signing manager 150 as discussed with reference to the memory sub-system in FIG. 1. In some cases, an asymmetric cryptographic algorithm, such as the RSA cryptographic algorithm, may be associated with two keys, such as a private key and a public key. The private key may be used when generating the asymmetric cryptographic signature that is signed to the firmware image. The public key can be shared with multiple devices outside the memory sub-system (e.g., public) and used to verify the asymmetric cryptographic signature. In this case, the signing of the firmware image (e.g., based upon the private key) can occur in a secure environment, such as a hardware signing machine, separate from the memory sub-system. The secure environment can be used to ensure that the private key is not improperly shared with outside devices. The public key can then be used to verify the integrity of the firmware image within the memory sub-system based upon the asymmetric cryptographic signature.

At operation 210, the memory sub-system can verify the integrity of the new firmware image based on the first (e.g., asymmetric) signing procedure. For example, the memory sub-system can receive the new firmware image which was signed with the asymmetric cryptographic signature in the secure environment, as discussed herein. The memory sub-system can verify the new firmware image based on an asymmetric signing procedure. For example, the memory device can verify the firmware image based upon the public key that is associated with the private key that was used by asymmetric signing manager 150 to sign the firmware image. The verification can be accomplished in or performed by a verification manager, such as verification manager 160 as discussed with reference to the memory sub-system in FIG. 1. The verification manager can verify the public key based upon the asymmetric cryptographic algorithm (e.g., the RSA algorithm). Since the private key may not be shared with outside devices, and the public key associated with the private key is used to verify the firmware image, asymmetric signing can provide a highly secure form of determining the integrity of the firmware image (e.g., the firmware image is not corrupt). In some cases, verification based upon the asymmetric signing procedure occurs outside the normal operation of the memory sub-system (e.g., during a firmware update or commissioning of the memory sub-system). As such, impacts to the regular operation (e.g., boot-up) of the memory sub-system, such as increased latency due to the two-key verification, can be avoided At operation 215, the memory sub-system can generate a second cryptographic signature. The generation of the second signature can occur after the initial verification of the firmware image (e.g., operation 210). Similar to the first cryptographic signature, the second cryptographic signature can be signed (e.g., written to) the firmware image, and used to verify the integrity of the firmware image based upon the second signing procedure. For example, the memory sub-system can generate a symmetric cryptographic signature based upon a symmetric cryptographic algorithm, such as a HMAC algorithm. This symmetric cryptographic signature can include a secret key associated with the symmetric cryptographic algorithm. Similar to the private key of the asymmetric signing procedure, the secret key of the symmetric cryptographic signature may not be shared with other devices (e.g., is private to the memory sub-system). In this case, the secret key can be used to verify the integrity of the firmware image in the memory device without the use of a public key. The generation of the symmetric cryptographic signature, including the secret key, can occur at a signing manager in the memory device, such as symmetric signing manager 160 as discussed with reference to the memory sub-system in FIG. 1.

At operation 220, the symmetric cryptographic signature can be written to the firmware image. As discussed previously, the new firmware image can have already been verified based upon the asymmetric signing for a first time at the memory sub-system. The symmetric cryptographic signature can be signed (e.g., written to) the firmware image in addition to, or alternatively to, the asymmetric cryptographic signature. As with generating the asymmetric cryptographic signature, a symmetric signing manager, such as symmetric signing manager 155 as discussed with reference to the memory sub-system in FIG. 1, can write (e.g., sign)

the symmetric signature to the firmware image. The symmetric cryptographic signature can be generated using a secret key which can be a unique random key generated by the memory device. The secret key can be used to verify the firmware image as discussed herein.

In some cases, the memory sub-system can verify the firmware image upon each boot-up of the memory sub-system. During boot-up, the integrity of the firmware can be checked to ensure that the memory sub-system is operating correctly. A corruption of the firmware image could have occurred when the memory sub-system was powered off. Therefore, upon boot-up of the memory sub-system, the integrity of the firmware image can be verified to ensure proper operation of the memory sub-system. However, in some cases, performing of the verification technique can be subject to time constraints such that the verification is to be performed within a given (e.g., limited) amount of time so as to not impact (or minimize the impact of) the operation of the memory sub-system during boot-up. For example, the verification is to be performed in the order of milliseconds. In this case, a verification process utilizing either the symmetric cryptographic signature and/or the asymmetric cryptographic signature can be used to support a relatively quick boot-up of the memory sub-system as compared to other verification techniques.

At operation 225, a verification process to verify the firmware image can be performed. The verification process can be performed on boot-up of the memory sub-system to ensure the integrity of the firmware image operating on the memory sub-system. The verification process can be used to lessen introduced latency on the boot-up of the memory device caused by the firmware image verification. The verification process can verify the firmware image based on either the first (e.g., asymmetric) signing procedure, the second (e.g., symmetric) signing procedure, or a combination of the asymmetric and symmetric signing procedures. The verification process includes operation 230, and optionally includes operations 235, 240, 250, and 255, to be discussed herein.

At operation 230, the memory sub-system can verify the firmware image based upon the symmetric signing procedure. For example, the memory sub-system can initially verify the firmware image based upon the secret key used to sign the firmware image and associated with the symmetric cryptographic algorithm (e.g., the HMAC algorithm). Verification manager 345, as discussed with reference to the memory sub-system in FIG. 3, can be used by the memory sub-system to verify the secret key. In some cases, the symmetric verification procedure can occur quickly (e.g., in the order of milliseconds). This can be due to the algorithms and/or operations associated with verification of a symmetric signature. For example, less complex algorithms and/or operations may be associated with verification using a secret key (e.g., verification of a symmetric cryptographic signature) than verification using a public key (e.g., verification of an asymmetric cryptographic signature). Therefore, in the case where the firmware image is verified based upon a symmetric verification procedure, latency of the boot-up of the device can be decreased.

In the event that the firmware image is verified based upon the symmetric signing procedure, the memory sub-system can safely boot-up the firmware. In some examples, such as at optional operation 235, the memory sub-system can additionally re-verify the firmware image based upon the asymmetric signing procedure. The asymmetric signing procedure verification can be similar to the asymmetric verification procedure of operation 240 to be discussed herein. The re-verification of the firmware image can be used as a backup to the verification of the symmetric cryptographic signature and can provide enhanced security for confirming the integrity of the firmware image (e.g., dual verification). However, since operation 235 is optional, the reverification based upon the asymmetric signing procedure is not necessary. Therefore any additional latency introduced by the asymmetric signature verification procedure can be optionally avoided.

In some cases, the memory sub-system can determine a failure to verify the firmware image based upon the second (e.g., symmetric) signing procedure. This could be due to a failure to verify the firmware image based on the secret key associated with the symmetric signing algorithm. In this case, the memory sub-system can verify the firmware image based upon the asymmetric signing procedure.

For example, at optional operation 240, the firmware image can be verified based upon the asymmetric signing procedure. Similar to operation 210, the verification can rely on the public key associated with the private key used to generate the asymmetric cryptographic signature based upon the asymmetric cryptographic algorithm (such as an RSA algorithm). A verification manager, such as verification manager 160, as discussed with reference to the memory sub-system in FIG. 1, can be used by the memory sub-system to verify public key. In some cases, the verification of the firmware image base on the asymmetric signing procedure can be a fallback verification procedure, utilized in addition to, or after the failure of, the verification based upon the symmetric signing procedure.

In some cases, the firmware image can be verified based upon the asymmetric signing procedure. In this case, even though the firmware image may have failed verification based upon the symmetric verification procedure, the memory sub-system can properly boot-up based upon the verification of the asymmetric signing procedure.

In some cases, the memory sub-system can determine a failure to verify the firmware image based upon the second (e.g., symmetric) signing procedure after determining the failure to verify the firmware image based upon the first (e.g., asymmetric) signing procedure. This could be due to a failure to verify the firmware image based on both the symmetric cryptographic signature and the asymmetric cryptographic signature. In this case, both failures can indicate a corruption of the firmware image, and indicate that the firmware image is unsafe to be used by the memory sub-system the memory sub-system can avoid booting up using the unverified firmware image. In this case, at optional operation 250, the memory sub-system can send an indication of a failure to verify the firmware image. The indication of the failure can be an error status indication, such as an error status code, that is sent from the memory sub-system. The memory sub-system can send the indication to the device that it received the firmware image from during operation 205, or could send the indication to a different device. At operation 255, the new firmware image can be received by the memory sub-system from the device that the memory sub-system sent the indication to in response to the indication. The new firmware image, rather than the initial firmware image, can be used by the memory device and can undergo similar verification procedures (e.g., operations 205-225) as discussed herein. In some cases, the new firmware image can be received after being signed with a new asymmetric cryptographic signature.

It should be noted that the methods described above describe possible implementations, and that the operations and the steps can be rearranged or otherwise modified and that other implementations are possible. Furthermore, portions from two or more of the methods can be combined.

Figure 3:
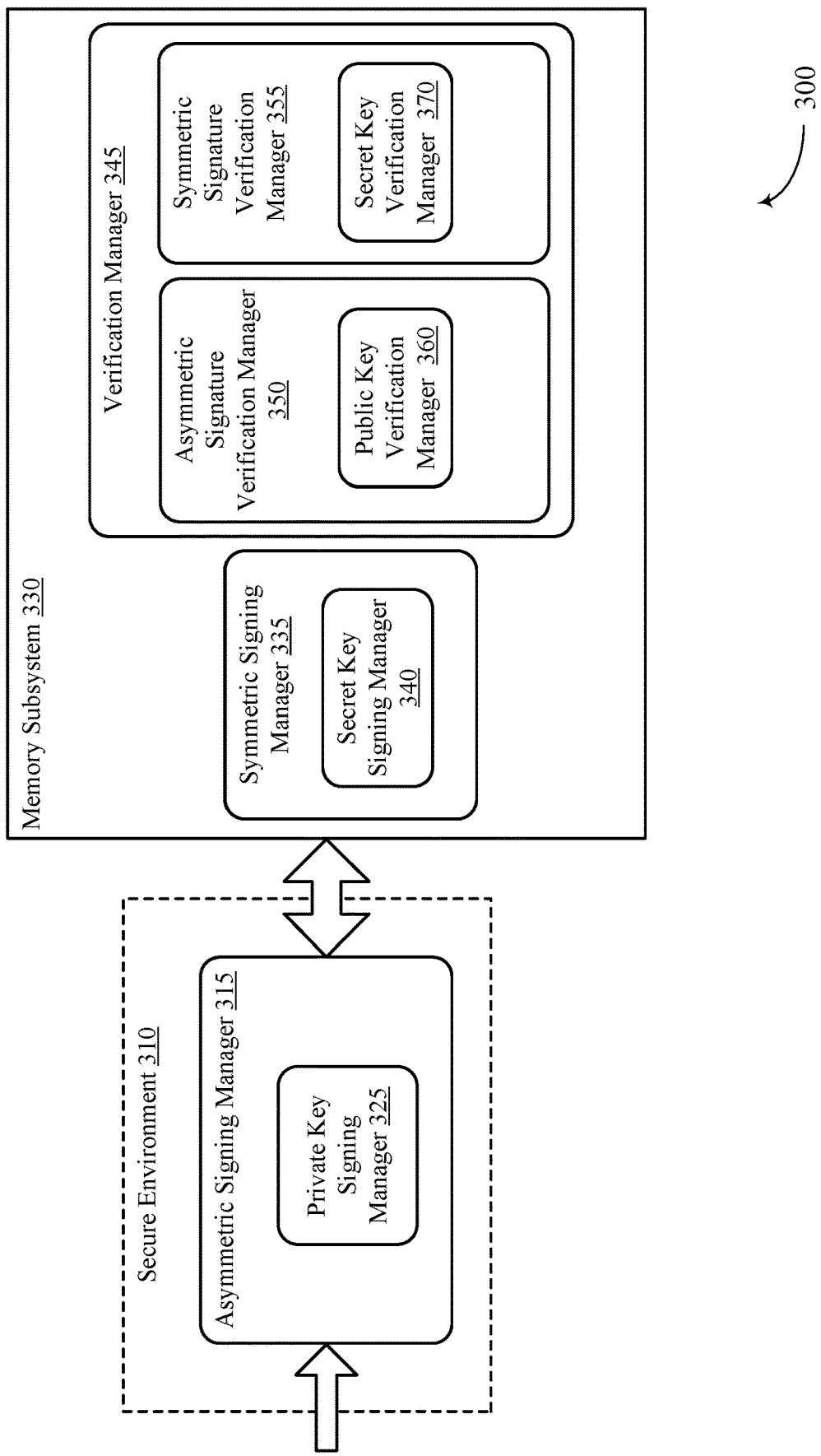
FIG. 3 is a diagram of an example system that supports verification of the integrity of a firmware image of a memory sub-system in accordance with some embodiments of the present disclosure.

FIG. 3 illustrates an example of a system 300 that supports verification of the integrity of a firmware image of a memory sub-system in accordance with examples as disclosed herein. In some cases, system 300 can perform method 200 as described with reference to FIG. 2.

System 300 includes an asymmetric signing manager 315. Asymmetric signing manager 315 can be an example of the asymmetric signing manager 150, as described with reference to FIG. 1. In some cases, asymmetric signing manager 315 can receive a firmware image from a source outside of system 300. The outside source can be a host system, such as host system 105 as described with reference to FIG. 1. The received firmware image can be signed by the asymmetric signing manager 315. In some cases, asymmetric signing manager 315 can be in a secure environment 310. For example, the asymmetric signing manager 315 can be part of a hardware signing machine (HSM) which is located in a secure facility. Secure environment 310 can be a location where system 300 undergoes initial fabrication, or can be a secure location where a secure firmware image is received. Secure environment 310 can be used to ensure that the firmware image signed by asymmetric signing manager 315 is a valid firmware image which has not been corrupted or tampered with by outside sources. Secure environment 310 can therefore ensure that the asymmetric signature signed to the firmware is a valid cryptographic signature.

Asymmetric signing manager 315 can include private key signing manager 325. Asymmetric signing manager 315 can sign the firmware image using the a private key associated with a asymmetric cryptographic algorithm, such as an RSA algorithm, as discussed with reference to the verification method in FIG. 2. Private key signing manager 325 can generate the private key associated with the asymmetric cryptographic algorithm, and can sign (e.g., write) a asymmetric cryptographic signature using the private key to the firmware image. As discussed previously, the public key can be openly shared with many devices, and the private key may not be shared with any other outside devices. The public key associated with the private key can be used by memory sub-system 330 to verify the integrity of the firmware image.

The asymmetric signing manager 315 can be in communication with memory sub-system 330. The memory sub-system 330 can receive the signed firmware image from asymmetric signing manager 315, such as at operation 205 as described with reference to FIG. 2. In this case, the received firmware image can be signed with the asymmetric cryptographic signature which can include both the private key and the public key associated with the asymmetric cryptographic algorithm (e.g., the RSA algorithm).

Memory sub-system 330 includes a symmetric signing manager 335. Asymmetric signing manager 335 can be an example of a symmetric signing manager 155, as described with reference to FIG. 1. Symmetric signing manager 335 can generate and sign (e.g., write) a symmetric cryptographic signature to the received firmware image, such as described with reference to operations 215 and 220 of FIG. 2. Symmetric signing manager 335 can include secret key signing manager 340. Secret key signing manager 340 can generate a secret key associated with the symmetric cryptographic algorithm (e.g., the HMAC algorithm). The generated secret key can be used to generate the symmetric signature written to the firmware image within memory sub-system 330 by secret key signing manager 340. The secret key generation and signing of the symmetric cryptographic signature can be isolated from outside corruption because the secret key signing manager 340 can be part of the memory sub-system 330.

Memory sub-system 330 includes a verification manager 345. Verification manager 345 can be an example the verification manager 160, as described with reference to FIG. 1. Verification manager 345 can be used to verify the firmware images integrity based on either the asymmetric signing procedure, the symmetric signing procedure, or both. Verification manager 345 includes asymmetric signature verification manager 350, which can be used to verify the firmware images integrity based upon an asymmetric signing procedure. Verification manager 345 also includes symmetric signature verification manager 355 which can be used to verify the firmware images integrity based upon a symmetric signing procedure. Verification manager 345 can use asymmetric signature verification manager 350 to verify the signed firmware image from the asymmetric signing manager 315, as described with reference to operation 210 of FIG. 2. Verification manager 345 can also use symmetric signature verification manager 355 and/or asymmetric signature verification manager 350 in a verification process which can verify the firmware image's integrity on boot-up, as described with reference to operation 225 of FIG. 2.

Asymmetric signature verification manager 350 includes a public key verification manager 360. Public key verification manager 360 can be used to verify the asymmetric signature by a public key associated with the private key used to sign the firmware image with the asymmetric cryptographic signature. Verification manager 350 can receive the firmware image that has been signed with the asymmetric cryptographic signature from asymmetric signing manager 315, as discussed previously. The asymmetric cryptographic signature can include a signature generated using the public key associated with the asymmetric cryptographic algorithm that was signed by private key signing manager 325, also discussed previously. Asymmetric signature verification manager 350 can receive the signed firmware image, and can initially verify the integrity of the received firmware image based on the public key associated with the private key used to generate the asymmetric cryptographic signature using the asymmetric signing procedure. The asymmetric signing procedure can verify the asymmetric cryptographic signature based upon the asymmetric cryptographic algorithm (e.g., the RSA algorithm). Once the firmware image has been successfully verified, memory sub-system 330 can be permitted to use the firmware image.

In some cases, asymmetric signature verification manager 350 can also be used to validate the firmware image upon boot-up of the memory sub-system 345. As with the initial verification of the firmware image, public key verification manager 360 can be used to verify the firmware image based upon the asymmetric signing procedure (e.g., verifying the public and private keys based upon the asymmetric cryptographic algorithm). In some cases, asymmetric signature verification manager 350 can verify the firmware image after symmetric signature verification manager 355 verifies the firmware image, as described with reference to operation 240 of FIG. 2. In other cases, asymmetric signature verification manager 350 can verify the firmware image in addition to the verification of the firmware image by symmetric signature verification manager 355, as described with reference to operation 235 of FIG. 2.

Symmetric signature verification manager 355 includes a secret key verification manager 370. Secret key verification manager 370 can be used to verify the secret key associated with the symmetric cryptographic signature. As discussed previously, symmetric signing manager 335 can generate and sign (e.g., write) a symmetric cryptographic signature to the received firmware image, which can include a signature generated using the secret key associated with a symmetric cryptographic algorithm (e.g., HMAC). Symmetric signature verification manager 355 can receive the signed firmware image, and the firmware image's integrity can be verified based on the secret key using the symmetric signing procedure. Similar to asymmetric signature verification manager 350, symmetric signature verification manager 355 can be used to verify the firmware image's integrity upon boot-up of the memory sub-system 345. For example, symmetric signature verification manager 355 can verify the firmware image upon boot-up of the memory sub-system, as described with reference to operation 230 of FIG. 2. This can occur before asymmetric signature verification manager 350 verifies the firmware image during boot-up (e.g., operation 240 as described with reference to FIG. 2), or as an alternative to asymmetric signature verification manager 350 verifying the firmware image on boot-up.

In some cases, the verification of the firmware image can be performed in less time by symmetric signature verification manager 355 as compared with the verification of the firmware image by asymmetric signature verification manager 350. This can be based upon the use of the algorithms and/or operations associated with each cryptographic algorithm. For example, verification of an asymmetric cryptographic algorithm may take more time than verification of a symmetric cryptographic algorithm. Therefore, in some cases, performing the verification of the firmware image by the symmetric signature verification manager 355 can lower the latency of the memory sub-system 110's boot-up procedure, since less time is needed to verify the firmware image.

Figure 4:
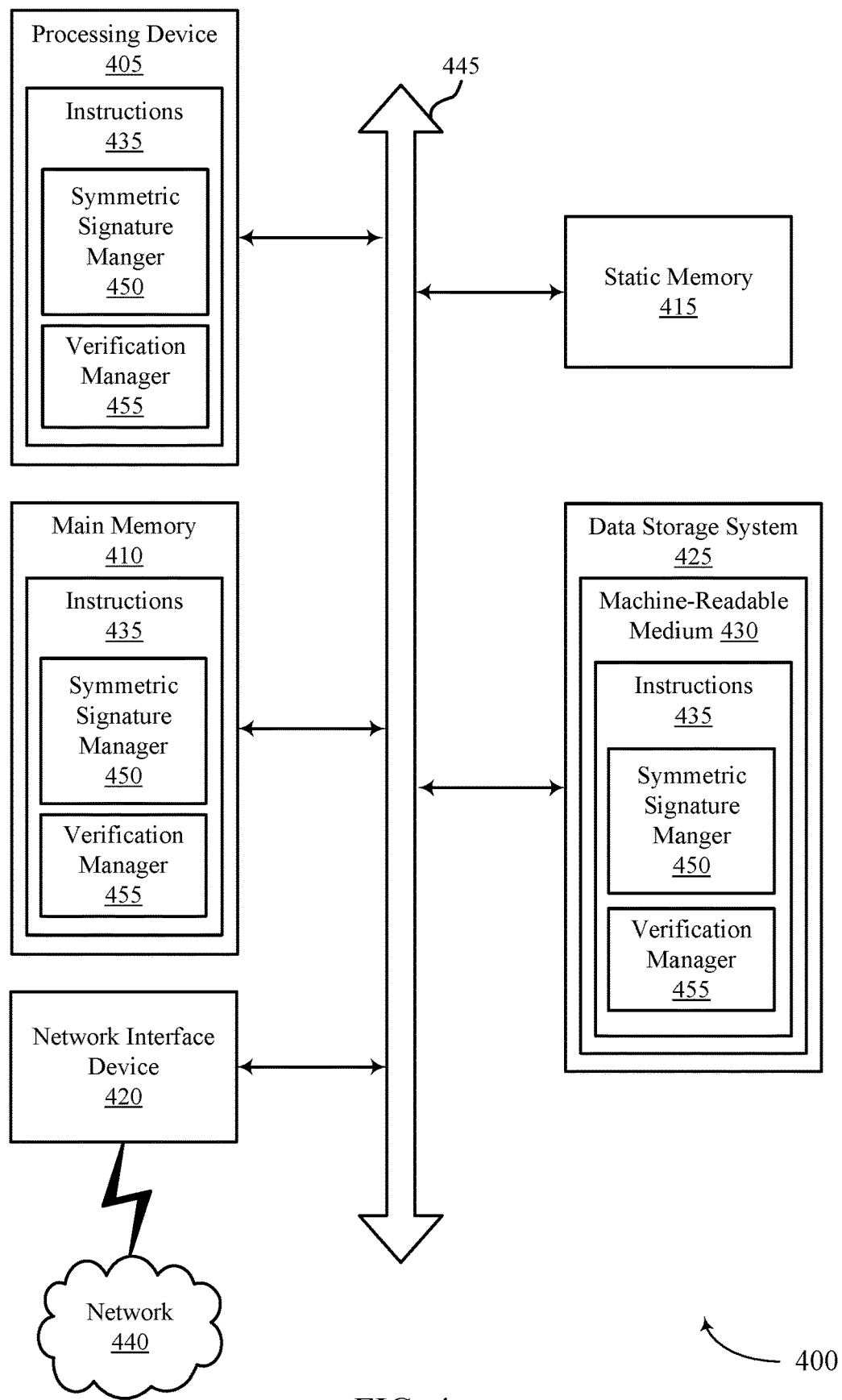
FIG. 4 is an example machine of a computer system in which examples of the present disclosure can operate.

FIG. 4 is an example machine of a computer system 400 in which examples of the present disclosure can operate. The computer system 400 can include a set of instructions, for causing the machine to perform any one or more of the techniques described herein. In some examples, the computer system 400 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the symmetric signing manager 155 and verification manager 160 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 400 can include a processing device 405, a main memory 410 (e.g., read-only memory (ROM), flash memory, DRAM such as synchronous DRAM (SDRAM) or RDRAM, etc.), a static memory 415 (e.g., flash memory, static random access memory (SRAM), etc.), and a data storage system 425, which communicate with each other via a bus 445.

Processing device 405 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 405 can also be one or more special-purpose processing devices such as an application specific integrated circuit (ASIC), a field programmable gate array (FPGA), a digital signal processor (DSP), network processor, or the like. The processing device 405 is configured to execute instructions 435 for performing the operations and steps discussed herein. The computer system 400 can further include a network interface device 420 to communicate over the network 440.

In some examples, the network interface device 420 can act as an interface for receiving a firmware image from an outside source. For example, the network interface device 420 can received the firmware image from a host system (e.g., host system 105 as described with reference to FIG. 1), a server, or another device in communication with network interface device 420. In some cases, the received firmware image can include a cryptographic signature signed to the firmware image. For example, the received firmware image can include a private and a public key signed to the firmware image. In this case, the private and public keys could have been signed to the firmware image by an asymmetric signing manager (e.g., asymmetric signing manager 150 as described with reference to FIG. 1).

The data storage system 425 can include a machine-readable storage medium 430 (also known as a computer-readable medium) on which is stored one or more sets of instructions 435 or software embodying any one or more of the methodologies or functions described herein. The instructions 435 can also reside, completely or at least partially, within the main memory 410 and/or within the processing device 405 during execution thereof by the computer system 400, the main memory 410 and the processing device 405 also constituting machine-readable storage media. The machine-readable storage medium 430, data storage system 425, and/or main memory 410 can correspond to a memory sub-system.

In one example, the instructions 435 include instructions to implement functionality corresponding to a symmetric signature manager 450 and a verification manager 455 (e.g., the symmetric signing manager 155 and verification manager 160 described with reference to FIG. 1). While the machine-readable storage medium 430 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, etc.

In the foregoing specification, examples of the disclosure have been described with reference to specific example examples thereof. It will be evident that various modifications can be made thereto without departing from the broader spirit and scope of examples of the disclosure as set forth in the following claims. The specification and drawings are, accordingly, to be regarded in an illustrative sense rather than a restrictive sense.

What is claimed is:

1. A method, comprising:
receiving, at a memory subsystem, a firmware image for the memory subsystem, the firmware image signed with a first signature according to a first signing procedure;
verifying an integrity of the firmware image based at least in part on the first signing procedure;
generating, after verifying the integrity, a second signature for the firmware image based at least in part on a second signing procedure different from the first signing procedure;
writing, by the memory subsystem, the second signature to the firmware image; and
performing a verification process of the firmware image in response to booting up the memory subsystem to verify the integrity of the firmware image based at least in part on the second signing procedure, and the first signing procedure, wherein a first verification time associated with the first signing procedure is greater than a second verification time associated with the second signing procedure.

2. The method of claim 1, wherein performing the verification process of the firmware image comprises: determining a failure to verify the integrity of the firmware image according to the second signing procedure.

3. The method of claim 2, wherein performing the verification process of the firmware image further comprises: verifying the integrity of the firmware image according to the first signing procedure after determining the failure to verify the integrity of the firmware image according to the second signing procedure.

4. The method of claim 1, wherein performing the verification process of the firmware image comprises: verifying the integrity of the firmware image according to the second signing procedure.

5. The method of claim 4, wherein performing the verification process of the firmware image further comprises: reverifying the integrity of the firmware image according to the first signing procedure after verifying the integrity of the firmware image according to the second signing procedure.

6. The method of claim 1, wherein performing the verification process of the firmware image comprises: determining a failure to verify the integrity of the firmware image according to the second signing procedure; determining a failure to verify the integrity of the firmware image according to the first signing procedure; and receiving a second firmware image for the memory subsystem, the firmware image signed with a third signature according to the first signing procedure.

7. The method of claim 6, wherein performing the verification process of the firmware image further comprises: sending an indication of a failure to verify the firmware image based at least in part on failing to verify the firmware image according to both the first and second signing procedures.

8. The method of claim 1, wherein the first signing procedure is based at least in part on an asymmetric cryptographic algorithm and the second signing procedure is based at least in part on a symmetric cryptographic algorithm.

9. The method of claim 8, wherein the asymmetric cryptographic algorithm is based at least in part on a Rivest Shamir Adleman (RSA) cryptographic algorithm and the symmetric cryptographic algorithm is based at least in part on a hash-based message authentication code (HMAC) cryptographic algorithm.

10. The method of claim 1, wherein writing the second signature to the firmware image comprises: generating a secret key based at least in part on the second signing procedure, and wherein writing the second signature is based upon the secret key.

11. The method of claim 1, wherein generating the second signature for the firmware image is based at least in part on a successful verification of the integrity of the firmware image according to the first signing procedure.

12. A method, comprising:
generating a first signature for a firmware image for a memory subsystem according to a first signing procedure;
writing the first signature to the firmware image;
receiving, by the memory subsystem, the firmware image and the first signature;
verifying, at the memory subsystem, an integrity of the firmware image based at least in part on the first signing procedure and the first signature;
writing, after verifying the integrity, a second signature to the firmware image based at least in part on a second signing procedure different from the first signing procedure; and
performing a verification process of the firmware image in response to booting up the memory subsystem to verify the integrity of the firmware image according to the second signing procedure, and the first signing procedure, wherein a first verification time associated with the first signing procedure is greater than a second verification time associated with the second signing procedure.

13. The method of claim 12, further comprising: powering on the memory subsystem; and performing the verification process of the firmware image after powering on the memory subsystem.

14. The method of claim 12, wherein generating the first signature comprises:
determining a pairing of a public key and a private key for the firmware image according to an asymmetric cryptographic signature algorithm.

15. The method of claim 12, wherein writing the second signature comprises: generating a symmetric key for the firmware image according to a symmetric cryptographic algorithm.

16. The method of claim 12, wherein performing the verification process of the firmware image comprises:
determining a failure to verify the integrity of the firmware image according to the second signing procedure;
determining a failure to verify the integrity of the firmware image according to the first signing procedure;
sending an indication of a failure to verify the firmware image based at least in part on failing to verify the firmware image according to both the first and second signing procedures; and
receiving a second firmware image for the memory subsystem, the firmware image signed with a third signature according to the first signing procedure, wherein the second firmware image is received based at least in part on the sent indication.

17. The method of claim 12, further comprising: generating the first signature according to a Rivest Shamir Adleman (RSA) cryptographic algorithm in an environment separate from the memory subsystem; and generating the second signature according to a hash-based message authentication code (HMAC) cryptographic algorithm at the memory subsystem.

18. A non-transitory computer-readable storage medium comprising instructions that, when executed by a processing device, cause the processing device to:
receive, at a memory subsystem, a firmware image for the memory subsystem, the firmware image signed with a first signature according to a first signing procedure;
verify an integrity of the firmware image based at least in part on the first signing procedure;
generate, after verifying the integrity, a second signature for the firmware image based at least in part on a second signing procedure different from the first signing procedure;
write, by the memory subsystem, the second signature to the firmware image; and
perform a verification process of the firmware image in response to booting up the memory subsystem to verify the integrity of the firmware image based at least in part on the second signing procedure, and the first signing procedure, wherein a first verification time associated with the first signing procedure is greater than a second verification time associated with the second signing procedure.

* * * * *